US010409681B2

(12) United States Patent
Sherlock et al.

(10) Patent No.: US 10,409,681 B2
(45) Date of Patent: Sep. 10, 2019

(54) NON-IDEMPOTENT PRIMITIVES IN FAULT-TOLERANT MEMORY (71) Applicant: HEWLETT PACKARD ENTERPRISE DEVELOPMENT LP, Houston, TX (US)

(72) Inventors: Derek Alan Sherlock, Fort Collins, CO (US); Harvey Ray, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,067

(22) PCT Filed: Jan. 30, 2015

(86) PCT No.: PCT/US2015/013898
§ 371 (c)(1),
(2) Date: Jan. 30, 2017

(87) PCT Pub. No.: WO2016/122637
PCT Pub. Date: Aug. 4, 2016

(65) Prior Publication Data
US 2017/0242753 A1    Aug. 24, 2017

(51) Int. Cl.
*G06F 11/10* (2006.01)
*G06F 11/14* (2006.01)
(Continued)

(52) U.S. Cl.
CPC .......... *G06F 11/1088* (2013.01); *G06F 3/064* (2013.01); *G06F 3/0619* (2013.01);
(Continued)

(58) Field of Classification Search
CPC .......................... G06F 11/1076; G06F 11/1088
See application file for complete search history.

(56) References Cited

U.S. PATENT DOCUMENTS

| | | |
|---|---|---|
| 5,032,744 A | 7/1991 | Wai Yeung |
| 5,243,592 A | 9/1993 | Perlman et al. |
| | (Continued) | |

FOREIGN PATENT DOCUMENTS

| | | |
|---|---|---|
| CN | 101576805 A | 11/2009 |
| CN | 102521058 A | 6/2012 |
| | (Continued) | |

OTHER PUBLICATIONS

International Search Report and Written Opinion; PCT/US2015/013898; dated Oct. 8, 2015; 11 pages.
(Continued)

*Primary Examiner* — Steve N Nguyen
(74) *Attorney, Agent, or Firm* — Hewlett Packard Enterprise Patent Department (57) ABSTRACT

According to an example, a retransmission sequence involving non-idempotent primitives in a fault-tolerant memory fabric may be modified. For example, a redundancy controller may request a sequence to access a stripe in the fault-tolerant memory fabric, wherein the sequence involves a non-idempotent primitive. In response to determining an expiration of a time threshold for the non-idempotent primitive, the redundancy controller may read other data in other cachelines in the stripe, calculate a new parity value by performing an idempotent exclusive-or primitive on the new data with the other data in the stripe, and write the new parity to the stripe using an idempotent write primitive.

15 Claims, 9 Drawing Sheets

(51) Int. Cl.
*G06F 3/06* (2006.01)
*G06F 11/20* (2006.01)

(52) U.S. Cl.
CPC ........ *G06F 3/0689* (2013.01); *G06F 11/1443* (2013.01); *G06F 11/2007* (2013.01)

(56) References Cited

U.S. PATENT DOCUMENTS

| | | | |
|---|---|---|---|
| 5,327,553 A | 7/1994 | Jewett et al. | |
| 5,533,999 A | 7/1996 | Hood et al. | |
| 5,546,535 A | 8/1996 | Stallmo et al. | |
| 5,555,266 A | 9/1996 | Buchholz et al. | |
| 5,633,996 A | 5/1997 | Hayashi et al. | |
| 5,633,999 A | 5/1997 | Clowes et al. | |
| 5,724,046 A | 3/1998 | Martin et al. | |
| 5,905,871 A | 5/1999 | Buskens et al. | |
| 6,073,218 A | 6/2000 | DeKoning et al. | |
| 6,081,907 A | 6/2000 | Witty et al. | |
| 6,092,191 A | 7/2000 | Shimbo et al. | |
| 6,141,324 A | 10/2000 | Abbott et al. | |
| 6,151,659 A | 11/2000 | Solomon et al. | |
| 6,181,704 B1 | 1/2001 | Drottar et al. | |
| 6,389,373 B1 | 5/2002 | Ohya | |
| 6,457,098 B1 | 9/2002 | DeKoning et al. | |
| 6,467,024 B1 | 10/2002 | Bish et al. | |
| 6,490,659 B1 | 12/2002 | McKean et al. | |
| 6,502,165 B1 | 12/2002 | Kishi et al. | |
| 6,510,500 B2 | 1/2003 | Sarkar et al. | |
| 6,542,960 B1 | 4/2003 | Wong et al. | |
| 6,654,830 B1 | 11/2003 | Taylor et al. | |
| 6,735,645 B1 | 5/2004 | Weber et al. | |
| 6,826,247 B1 | 11/2004 | Elliott et al. | |
| 6,834,326 B1* | 12/2004 | Wang | G06F 11/1076 370/355 |
| 6,911,864 B2 | 6/2005 | Bakker et al. | |
| 6,938,091 B2 | 8/2005 | Das Sharma | |
| 6,970,987 B1* | 11/2005 | Ji | G06F 11/1076 711/162 |
| 7,366,808 B2 | 4/2008 | Kano et al. | |
| 7,506,368 B1 | 3/2009 | Kersey et al. | |
| 7,738,540 B2 | 6/2010 | Yamasaki et al. | |
| 7,839,858 B2 | 11/2010 | Wiemann et al. | |
| 7,908,513 B2 | 3/2011 | Ogasawara et al. | |
| 7,934,055 B2 | 4/2011 | Flynn et al. | |
| 7,996,608 B1 | 8/2011 | Chatterjee et al. | |
| 8,005,051 B2 | 8/2011 | Watanabe | |
| 8,018,890 B2 | 9/2011 | Venkatachalam et al. | |
| 8,054,789 B2 | 11/2011 | Boariu et al. | |
| 8,103,869 B2 | 1/2012 | Balandin et al. | |
| 8,135,906 B2 | 3/2012 | Wright et al. | |
| 8,161,236 B1* | 4/2012 | Noveck | G06F 17/30132 711/113 |
| 8,169,908 B1 | 5/2012 | Sluiter et al. | |
| 8,171,227 B1 | 5/2012 | Goldschmidt et al. | |
| 8,332,704 B2 | 12/2012 | Chang et al. | |
| 8,341,459 B2 | 12/2012 | Kaushik et al. | |
| 8,386,834 B1 | 2/2013 | Goel et al. | |
| 8,386,838 B1 | 2/2013 | Byan et al. | |
| 8,462,690 B2 | 6/2013 | Chang et al. | |
| 8,483,116 B2 | 7/2013 | Chang et al. | |
| 8,605,643 B2 | 12/2013 | Chang et al. | |
| 8,619,606 B2 | 12/2013 | Nagaraja | |
| 8,621,147 B2 | 12/2013 | Galloway et al. | |
| 8,667,322 B1 | 3/2014 | Chatterjee et al. | |
| 8,700,570 B1 | 4/2014 | Marathe et al. | |
| 8,793,449 B1* | 7/2014 | Kimmel | G06F 12/00 711/114 |
| 8,812,901 B2 | 8/2014 | Sheffield, Jr. | |
| 9,128,948 B1 | 9/2015 | Raorane | |
| 9,166,541 B2 | 10/2015 | Funato et al. | |
| 9,298,549 B2 | 3/2016 | Camp et al. | |
| 9,621,934 B2* | 4/2017 | Seastrom | H04N 21/23608 |
| 2001/0002480 A1 | 5/2001 | Dekoning et al. | |
| 2002/0162076 A1 | 10/2002 | Talagala et al. | |
| 2003/0037071 A1 | 2/2003 | Harris et al. | |
| 2003/0126315 A1 | 7/2003 | Tan et al. | |
| 2004/0133573 A1 | 7/2004 | Miloushev et al. | |
| 2004/0233078 A1 | 11/2004 | Takehara | |
| 2005/0027951 A1 | 2/2005 | Piccirillo et al. | |
| 2005/0044162 A1* | 2/2005 | Liang | G06F 17/30067 709/212 |
| 2005/0120267 A1 | 6/2005 | Burton et al. | |
| 2005/0144406 A1 | 6/2005 | Chong, Jr. | |
| 2005/0157697 A1 | 7/2005 | Lee et al. | |
| 2006/0112304 A1 | 5/2006 | Subramanian et al. | |
| 2006/0129559 A1 | 6/2006 | Sankaran et al. | |
| 2006/0264202 A1 | 11/2006 | Hagmeier et al. | |
| 2007/0028041 A1 | 2/2007 | Hallyal et al. | |
| 2007/0140692 A1 | 6/2007 | Decusatis et al. | |
| 2007/0168693 A1 | 7/2007 | Pittman | |
| 2007/0174657 A1 | 7/2007 | Ahmadian et al. | |
| 2008/0060055 A1 | 3/2008 | Lau | |
| 2008/0137669 A1 | 6/2008 | Balandina et al. | |
| 2008/0201616 A1 | 8/2008 | Ashmore | |
| 2008/0281876 A1 | 11/2008 | Mimatsu | |
| 2009/0080432 A1 | 3/2009 | Kolakeri et al. | |
| 2009/0259882 A1 | 10/2009 | Shellhamer | |
| 2009/0313313 A1 | 12/2009 | Yokokawa et al. | |
| 2010/0107003 A1 | 4/2010 | Kawaguchi | |
| 2010/0114889 A1* | 5/2010 | Rabii | G06F 17/30197 707/737 |
| 2011/0109348 A1 | 5/2011 | Chen et al. | |
| 2011/0173350 A1 | 7/2011 | Coronado et al. | |
| 2011/0208994 A1 | 8/2011 | Chambliss et al. | |
| 2011/0213928 A1 | 9/2011 | Grube et al. | |
| 2011/0246819 A1 | 10/2011 | Callaway et al. | |
| 2011/0314218 A1 | 12/2011 | Bert | |
| 2012/0032718 A1 | 2/2012 | Chan et al. | |
| 2012/0059800 A1 | 3/2012 | Guo | |
| 2012/0096329 A1 | 4/2012 | Taranta, II | |
| 2012/0137098 A1 | 5/2012 | Wang et al. | |
| 2012/0166699 A1 | 6/2012 | Kumar et al. | |
| 2012/0166909 A1 | 6/2012 | Schmisseur et al. | |
| 2012/0201289 A1 | 8/2012 | Abdalla et al. | |
| 2012/0204032 A1 | 8/2012 | Wilkins et al. | |
| 2012/0213055 A1 | 8/2012 | Bajpai et al. | |
| 2012/0297272 A1 | 11/2012 | Bakke et al. | |
| 2012/0311255 A1 | 12/2012 | Chambliss | |
| 2013/0060948 A1 | 3/2013 | Ulrich et al. | |
| 2013/0128721 A1 | 5/2013 | Decusatis et al. | |
| 2013/0128884 A1 | 5/2013 | Decusatis et al. | |
| 2013/0138759 A1 | 5/2013 | Chen et al. | |
| 2013/0148702 A1 | 6/2013 | Payne | |
| 2013/0227216 A1 | 8/2013 | Cheng et al. | |
| 2013/0246597 A1* | 9/2013 | Iizawa | H04L 69/40 709/223 |
| 2013/0297976 A1 | 11/2013 | McMillen | |
| 2013/0311822 A1 | 11/2013 | Kotzur et al. | |
| 2013/0312082 A1 | 11/2013 | Izu et al. | |
| 2014/0067984 A1 | 3/2014 | Danilak | |
| 2014/0095865 A1 | 4/2014 | Yerra et al. | |
| 2014/0115232 A1 | 4/2014 | Goss et al. | |
| 2014/0136799 A1 | 5/2014 | Fortin | |
| 2014/0269731 A1 | 9/2014 | Decusatis et al. | |
| 2014/0281688 A1 | 9/2014 | Tiwari et al. | |
| 2014/0304469 A1 | 10/2014 | Wu | |
| 2014/0331297 A1 | 11/2014 | Innes et al. | |
| 2015/0012699 A1 | 1/2015 | Rizzo et al. | |
| 2015/0095596 A1 | 4/2015 | Yang et al. | |
| 2015/0146614 A1 | 5/2015 | Yu et al. | |
| 2015/0199244 A1 | 7/2015 | Venkatachalam et al. | |
| 2015/0288752 A1 | 10/2015 | Voigt | |
| 2016/0034186 A1 | 2/2016 | Weiner et al. | |
| 2016/0170833 A1 | 6/2016 | Segura et al. | |
| 2016/0196182 A1 | 7/2016 | Camp et al. | |
| 2016/0226508 A1 | 8/2016 | Kurooka et al. | |
| 2017/0253269 A1 | 9/2017 | Kanekawa et al. | |

(56) References Cited

U.S. PATENT DOCUMENTS

| | | |
|---|---|---|
| 2017/0302409 A1 | 10/2017 | Sherlock |
| 2017/0346742 A1 | 11/2017 | Shahar et al. |

FOREIGN PATENT DOCUMENTS

| | | |
|---|---|---|
| CN | 10433358 A | 2/2015 |
| EP | 1347369 B1 | 11/2012 |
| IN | 1546/MUM/2013 | 3/2015 |
| TW | 201346530 A | 11/2013 |
| WO | WO-02091689 A1 | 11/2002 |
| WO | 2014/120136 A1 | 8/2014 |

OTHER PUBLICATIONS

Paulo Sergio Almeida et al; Scalable Eventually Consistent Counters Over Unreliable Networks; Jul. 12, 2013; 32 Pages.

Amiri, K. et al., Highly Concurrent Shared Storage, (Research Paper), Sep. 7, 1999, 25 Pages.

International Search Report and Written Opinion; PCT/US2014/053704; dated May 15, 2015; 13 pages.

Razavi, B. et al., "Design Techniques for High-Speed, High-Resolution Comparators," (Research Paper), IEEE Journal of Solid-State Circuits 27.12, Dec. 12, 1992, pp. 1916-1926, http://www.seas.ucla.edu/brweb/paper/Journals/R%26WDec92_2.pdf.

Xingyuan, T. et al., "An Offset Cancellation Technique in a Switched-Capacitor Comparator for SAR ADCs;"; (Research Paper), Journal of Semiconductors 33.1, Jan. 2012, 5 pages, http://www.jos.ac.cn/bdtxbcn/ch/reader/create_pdf.aspx?file_no=11072501.

Mao, Y. et al., A New Parity-based Migration Method to Expand Raid-5, (Research Paper), Nov. 4, 2013, 11 Pages.

Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, Dec. 2014, pp. 3091-3103.

International Searching Authority, The International Serach Report 6 and the Written Opinion, dated Feb. 26, 2015, 10 Pages.

Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.

International Search Report and Written Opinion received for PCT Patent Application No. PCT/US2015/023708, dated Apr. 22, 2016, 11 pages.

International Search Report and Written Opinion received for PCT Patent Application No. PCT/US2014/062196, dated Jun. 30, 2015, 13 pages.

International Preliminary Report on Patentability received for PCT Patent Application No. PCT/US2015/023708, dated Oct. 12, 2017, 10 pages.

International Preliminary Report on Patentability received for PCT Patent Application No. PCT/US2015/013817, dated Aug. 10, 2017, 9 pages.

International Preliminary Report on Patentability received for PCT Patent Application No. PCT/US2014/062196, dated May 4, 2017, 12 pages.

EMC2; High Availability and Data Protection with EMC Isilon Scale-out NAS, (Research Paper); Nov. 2013; 36 Pages.

Do I need a second RAID controller for fault-tolerance ?, (Research Paper); Aug. 22, 2010; 2 Pages; http://serverfault.com/questions/303869/do-i-need-a-second-raid-controller-for-fault-tolerance.

Li, M. et al.: Toward I/O-Efficient Protection Against Silent Data Corruptions in RAID Arrays, (Research Paper); Jun. 2-6, 2014; 12 Pages.

International Search Report and Written Opinion; PCT/US2015/013921; dated Oct. 28, 2015; 12 pages.

International Search Report and Written Opinion received for PCT Patent Application No. PCT/US2015/013921, dated Oct. 28, 2015, 10 pages.

International Search Report and Written Opinion received for PCT Patent Application No. PCT/US2015/013898, dated Oct. 8, 2015, 9 pages.

International Search Report and Written Opinion received for PCT Patent Application No. PCT/US2015/013817, dated Oct. 29, 2015, 11 pages.

International Search Report and Written Opinion received for PCT Patent Application No. PCT/US2014/053704, dated May 15, 2015, 11 pages.

International Search Report and Written Opinion received for PCT Patent Application No. PCT/US2014/049193, dated Feb. 26, 2015, 8 pages.

International Preliminary Report on Patentability received for PCT Patent Application No. PCT/US2015/013921, dated Aug. 10, 2017, 9 pages.

International Preliminary Report on Patentability received for PCT Patent Application No. PCT/US2015/013898, dated Aug. 10, 2017, 8 pages.

International Preliminary Report on Patentability received for PCT Patent Application No. PCT/US2014/053704, dated Mar. 16, 2017, 10 pages.

International Preliminary Report on Patentability received for PCT Patent Application No. PCT/US2014/049193, dated Feb. 9, 2017, 7 pages.

* cited by examiner

NON-IDEMPOTENT PRIMITIVES IN FAULT-TOLERANT MEMORY

BACKGROUND

Current data storage devices such as volatile and non-volatile memory often include fault tolerance mechanisms to ensure that data remains available in the event of a device error or failure.

An example of a fault tolerance mechanism provided to current data storage devices is a redundant array of independent disks (RAID). RAID is a storage technology that controls multiple memory modules and provides fault tolerance by storing data with redundancy. RAID technology may store data with redundancy in a variety of ways. Examples of redundant data storage include duplicating data and storing the data in multiple memory modules and adding parity to store calculated error recovery bits. The multiple memory modules, which may include the data and associated parity, may be accessed concurrently by multiple redundancy controllers.

Another example of a fault tolerance mechanism provided to current data storage devices is an end-to-end retransmission scheme. The end-to-end retransmission scheme is utilized to create a reliable memory fabric that retransmits individual packets or entire routes that are lost enroute to a protocol agent due to transient issues such as electrical interference, or persistent issues such as the failure of a routing component, cable, or connector.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

In addition, the following terms will be used throughout the remainder of the present disclosure. The term fabric may mean some combination of interconnected fabric devices used to convey packet-based information between endpoint components. The term memory fabric may mean a fabric used, at least in part, to provide connectivity between redundancy controllers and media controllers. The term protocol agents may mean endpoints (e.g., producers and consumers of data) that communicate with each other over a memory fabric. The term redundancy controller may mean a requesting protocol agent that acts on behalf of a central processing unit (CPU), input output (I/O) device, or other user of memory, and generates requests such as read and write requests to one or more responding protocol agents (e.g., media controllers). The redundancy controller may be the attachment point where producers or consumers of data attach to the fabric. The redundancy controller may communicate with multiple media controllers and may implement redundant storage of data across more than one media controller on behalf of a CPU, I/O device, etc., such that the failure of a subset of the media controllers will not result in loss of data or interruption of system operation. The term media controller may mean a responding protocol agent that connects memory or storage devices to a memory fabric. The media controller may receive requests such as read and write requests, control the memory or storage devices, and return corresponding responses. The media controller may be the attachment point where data storage attaches to the memory fabric.

The term command may mean a transaction sent from a processor, I/O device or other source to a redundancy controller, which causes the redundancy controller to issue a sequence. The term primitive may mean a single request issued by a redundancy controller to a media controller along with its corresponding response from the media controller back to the redundancy controller. The term idempotent primitive may mean a primitive that has no additional effect if the packet is received more than once. The term non-idempotent primitive may mean a primitive that has an additional effect if the packet is received more than once. The term sequence may mean an ordered set of primitives issued by a redundancy controller to one or more media controllers to execute a command received from a processor, I/O device or other source. The term locked sequence may mean a sequence that requires atomic access to multiple media controllers. The term cacheline may mean a unit of data that may be read from or written to a media controller by a redundancy controller. The term is not intended to be restrictive. The cacheline may include any type or size of data, such as a disk sector, a solid-state drive (SSD block), a RAID block or a processor cacheline. The term stripe may mean a set of one or more data cachelines, and associated redundancy information stored in one or more parity cachelines that are distributed across multiple memory modules. The term RAID degraded mode may mean a mode of operation of a RAID redundancy controller following the failure of a survivable subset of the media controllers or their memory devices. In degraded mode, reads and writes access the surviving media controllers only.

Disclosed herein are examples of methods to modify a retransmission sequence involving non-idempotent primitives in a fault-tolerant memory. The fault-tolerant memory may be a packet-switched memory fabric that connects one or more requesting protocol agents to a plurality of responding protocol agents. The fault-tolerant memory may, for instance, implement RAID storage technology. A retransmission sequence is used to create a reliable fabric when individual packets or entire routes may be lost enroute to a protocol agent. An example of a retransmission sequence is a protocol layer end-to-end retransmission sequence, where entire protocol-layer primitives (e.g., read-request-to-read-return) are timed by the protocol agent that issues the request, and the entire primitive is repeated in the event that the entire primitive does not complete.

The protocol layer end-to-end retransmission sequence, however, may be unsafe for the carriage of non-idempotent primitives from a requesting protocol agent to a responding protocol agent in the fault-tolerant memory. For example, when a response fails to arrive back at the requesting protocol agent, the requesting protocol agent does not know whether the initial request had already reached the responding protocol agent. Thus, when the requesting protocol agent resends the request, the same packet may be received twice by the responding protocol agent.

Accordingly, the disclosed examples provide a method to safely use non-idempotent primitives across a protocol-layer end-to-end retransmission-protected memory fabric by modifying the sequence to utilize storage redundancy to reconstruct lost packets from the non-idempotent primitives. According to an example, a redundancy controller may request a sequence to access a stripe in the fault-tolerant memory fabric, wherein the sequence involves a non-idempotent primitive. In response to determining an expiration of a time threshold for the non-idempotent primitive, the redundancy controller may read other data in other cachelines in the stripe, use RAID to regenerate data that was potentially corrupted by a first transmission of the non-idempotent primitive, write the regenerated data to the stripe, reissue the non-idempotent primitive on an alternate fabric route, calculate a new parity value by performing an idempotent exclusive-or primitive on the new data with the other data in the stripe, and write the new parity to the stripe using the idempotent write primitive.

End-to-end retransmission sequences may require packets to be stored in a costly "replay buffer" by protocol agents and that an explicit end-to-end acknowledgement is delivered. For example, each request packet that crosses the multi-hop memory fabric is acknowledged by a completion message crossing back in the other direction. The requesting protocol agent waits for the completion message while holding a copy of the requested packet in a replay buffer so that the requested packet may be resent if the completion message never arrives. The expiration of a predetermined time threshold while waiting for the completion message triggers a resend of the copy of the requested packet from the replay buffer, possibly via an alternate fabric route. Completion messages consume considerable memory fabric bandwidth, so it is advantageous to use a protocol-layer end-to-end retransmission scheme, where the protocol-layer responses serve double-purpose as delivery acknowledgements.

The protocol-layer end-to-end retransmission sequence of the disclosed examples may structure all traffic as primitives of request and response packets and rely upon the storage redundancy inherent in RAID to correct the aftermath of a lost packet in a non-idempotent sequence. A timer in the redundancy controller may monitor how long each request has been outstanding before a response is received, and if the timer reaches a predetermined time threshold, either the request packet or the response packet is known to have been lost. This approach has the advantages that (a) no dedicated replay buffer is required for storing individual request and response packets, as the entire protocol layer may be replayed instead, and (b) fabric overhead associated with completion packets or acknowledgement fields in packets may be avoided.

As discussed above, this end-to-end retransmission sequence may not be safe for the carriage of non-idempotent packets. For example, simple read and write primitives to a single media controller are idempotent provided proper precautions are taken to avoid race conditions between multiple redundancy controllers. That is, a second read primitive immediately following a first one returns identical data and a second write primitive immediately following a first one writes the same data. However, non-idempotent primitives such as swap, increment, etc. are non-idempotent. For example an increment primitive increases a stored value by one, but when delivered twice, the increment primitive increases the stored value by two instead. Accordingly, when a response fails to arrive back at a requesting redundancy controller, the timer expiration informs the requesting redundancy controller that either the request packet or a resulting response packet has been lost. However, there is no way for the requesting redundancy controller to know which of these two packets was lost. As such, there is no way to know whether the request had already reached the media controller. Thus, the redundancy controller may resend the request, which would result in the same packet being received twice by the media controller.

Non-idempotent primitives, for example, are valuable in RAID storage. A write primitive to a RAID stripe typically includes a sequence of events whereby a redundancy controller reads old data from a media controller, then reads the old parity typically from a different media controller, writes the new data to the first media controller, calculates the new parity value from the new and old data and old parity values, and finally writes the new value of the parity to the appropriate media controller. Since individual read and write primitives are idempotent, the entire sequence may be implemented entirely composed of idempotent primitives. However, this is a very sub-optimal implementation. A more optimized implementation might, for example, merge the data read and data write into a single data swap primitive, which writes new data, while returning the prior data, or use an exclusive-or (XOR) primitive in place of a parity read primitive and parity write primitive. This increases performance and lowers memory fabric traffic by combining two primitives into one primitive. Unfortunately, the swap and XOR primitives are non-idempotent primitives. That is, if the swap primitive is received a second time, it cannot return the correct old data as it has already been overwritten in the first delivery of the swap primitive. Similarly, an XOR primitive is ineffective if received twice because the second transmission undoes the effect of the first transmission. Accordingly, the disclosed examples provide a method to safely use non-idempotent primitives in a protocol-layer end-to-end retransmission-protected memory fabric by modifying the retransmission sequence.

The disclosed examples may provide the technical benefits and advantages of an end-to-end retransmission-protected memory fabric without incurring the memory fabric overhead and replay-buffer storage costs associated with packet delivery acknowledgment. Furthermore, the disclosed examples do not incur the performance and memory fabric overhead costs of foregoing the swap and XOR primitive optimizations. In this regard, the disclosed method takes advantage of non-idempotent primitive optimizations while avoiding repeat delivery hazards that are associated with the carriage of non-idempotent primitives across a protocol-layer end-to-end retransmission-protected memory fabric during a retransmission sequence.

Figure 1A:
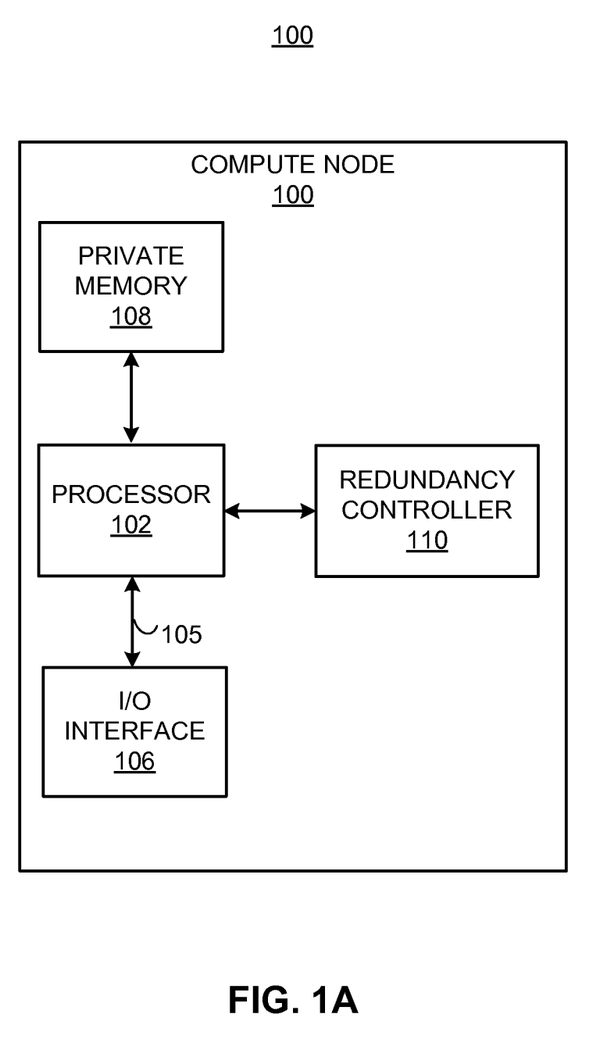
FIG. 1A shows a simplified block diagram of a compute node to modify a retransmission sequence involving non-idempotent primitives in a fault-tolerant memory fabric, according to an example of the present disclosure.

With reference to FIG. 1A, there is shown a block diagram of a compute node (e.g., computing device, input/output (I/O) server node) 100 for modifying a retransmission sequence involving non-idempotent primitives in a fault-tolerant memory fabric according to an example of the present disclosure. It should be understood that the compute node 100 may include additional components and that one or more of the components described herein may be removed and/or modified without departing from a scope of the compute node 100.

For example, the compute node 100 may include a processor 102, an input/output interface 106, a private memory 108, and a redundancy controller 110. In one example, the compute node 100 is a server but other types of compute nodes may be used. The compute node 100 may be a node of a distributed data storage system. For example, the compute node 100 may be part of a cluster of nodes that services queries and provides data storage for multiple users or systems, and the nodes may communicate with each other to service queries and store data. The cluster of nodes may provide data redundancy to prevent data loss and minimize down time in case of a node failure.

The processor 102 may be a microprocessor, a microcontroller, an application specific integrated circuit (ASIC), field programmable gate array (FPGA), or other type of circuit to perform various processing functions. The private memory 108 may include volatile dynamic random access memory (DRAM) with or without battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory. The I/O interface 106 may include a hardware and/or a software interface. The I/O interface 106 may be a network interface connected to a network, such as the Internet, a local area network, etc. The compute node 100 may receive data and user-input through the I/O interface 106. Where examples herein describe redundancy controller behavior occurring in response to commands issued by the processor 102, this should not be taken restrictively. The examples are also applicable if such commands are issued by an I/O device via interface 106.

The components of computing node 100 may be coupled by a bus 105, where the bus 105 may be a communication system that transfers data between the various components of the computing device 100. In examples, the bus 105 may be a Peripheral Component Interconnect (PCI), Industry Standard Architecture (ISA), PCI-Express, HyperTransport®, NuBus, a proprietary bus, and the like. Alternatively, the processor 102 may use multiple different fabrics to communicate with the various components, such as PCIe for I/O, DDR3 for memory, and QPI for the redundancy controller.

The redundancy controller 110, for example, may act on behalf of the processor 102 and generate sequences of primitives such as read, write, swap, XOR, lock, unlock, etc. requests to one or more responding protocol agents (e.g., media controllers 120A-M) as discussed further below with respect to FIG. 1B. The redundancy controller 110 may communicate with multiple ones of the media controllers 120A-M, in which "M" represents an integer value greater than one, and may implement redundant storage of data across more than one media controller on behalf of the processor 102 such that the failure of a subset of the media controllers 120A-M will not result in loss of data or interruption of system operation. The redundancy controller 110, for example, may generate certain sequences of primitives independently, not directly resulting from processor commands. These include sequences used for scrubbing, initializing, migrating, or error-correcting memory. The functionality of the redundancy controller 110 may be implemented by hardware.

Figure 1B:
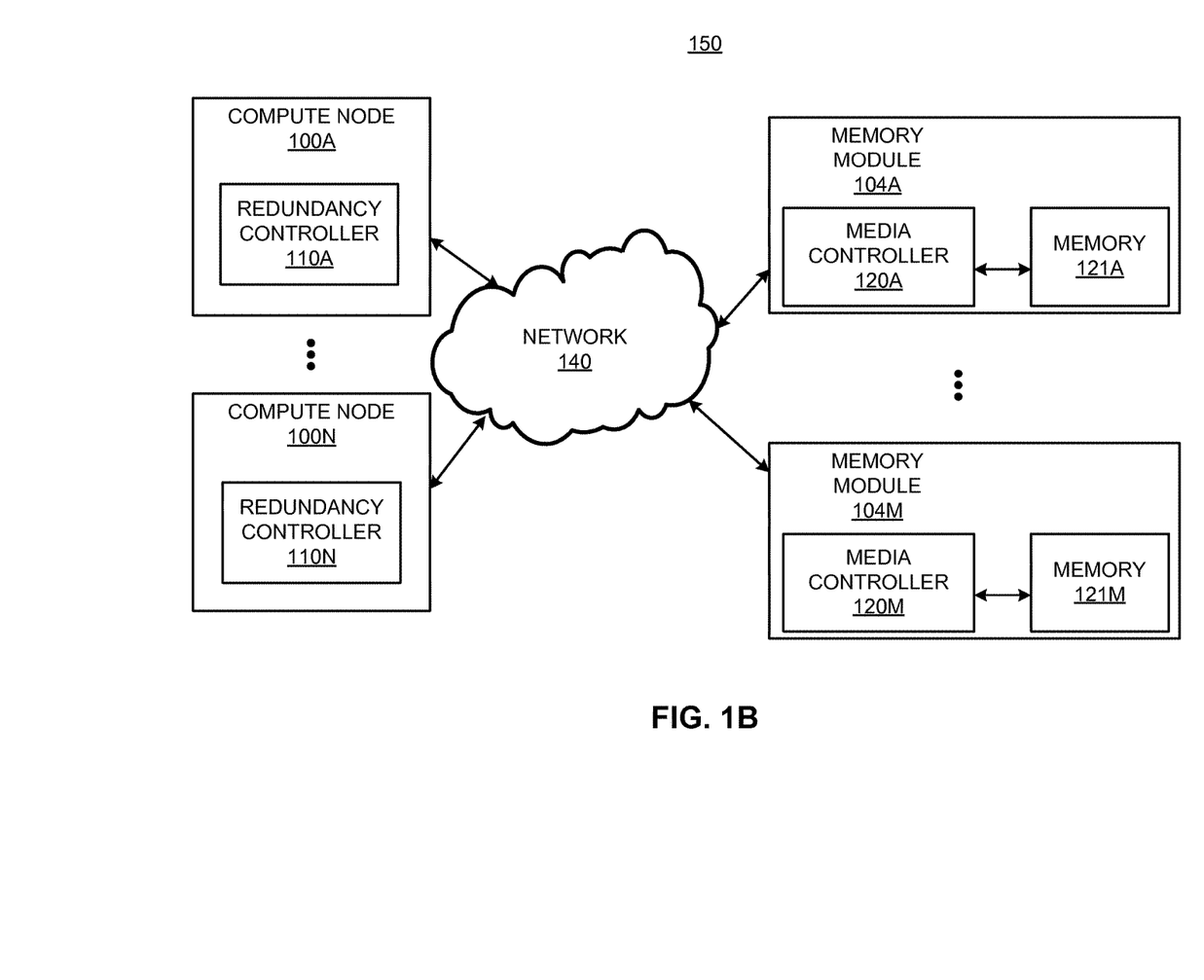
FIG. 1B shows a simplified block diagram of a fault tolerant system to modify a retransmission sequence involving non-idempotent primitives in a fault-tolerant memory fabric, according to an example of the present disclosure.

With reference to FIG. 1B, there is shown a block diagram of a fault tolerant system 150 according to an example of the present disclosure. It should be understood that the system 150 may include additional components and that one or more of the components described herein may be removed and/or modified without departing from a scope of the system 150. The system 150 may include multiple compute nodes 100A-N (where the number of compute nodes is greater than or equal to 1), a network 140, and memory modules 104A-M.

The multiple compute nodes 100A-N may be coupled to the memory modules 104A-M through the network 140. The memory modules 104A-M may include media controllers 120A-M and memories 121A-M. Each media controller, for instance, may communicate with its associated memory and control access to the memory by the redundancy controllers 110A-N, which in turn are acting on behalf of the processors. The media controllers 120A-M provide access to regions of memory. The regions of memory are accessed by multiple redundancy controllers in the compute nodes 100A-N using access primitives such as read, write, lock, unlock, swap, XOR, etc. In order to support aggregation or sharing of memory, media controllers 120A-M may be accessed by multiple redundancy controllers (e.g., acting on behalf of multiple servers). Thus, there is a many-to-many relationship between redundancy controllers and media controllers. Each of the memories 121A-M may include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory.

As described in the disclosed examples, the redundancy controllers 110A-N may maintain fault tolerance across the memory modules 104A-M. The redundancy controller 110 may receive commands from one or more processors 102, I/O devices, or other sources. In response to receipt of these commands, the redundancy controller 110 generates sequences of primitive accesses to multiple media controllers 120A-M. The redundancy controller 110 may also generate certain sequences of primitives independently, not directly resulting from processor commands. These include sequences used for scrubbing, initializing, migrating, or error-correcting memory. The media controllers 120A-M may then respond to the requested primitives with a completion message.

RAID stripe locks acquired and released by the redundancy controller 110 guarantee atomicity for locked sequences. Accordingly, the shortened terms "stripe" and "stripe lock" has been used throughout the text to describe RAID stripes and locks on RAID stripes, respectively.

Figure 1C:
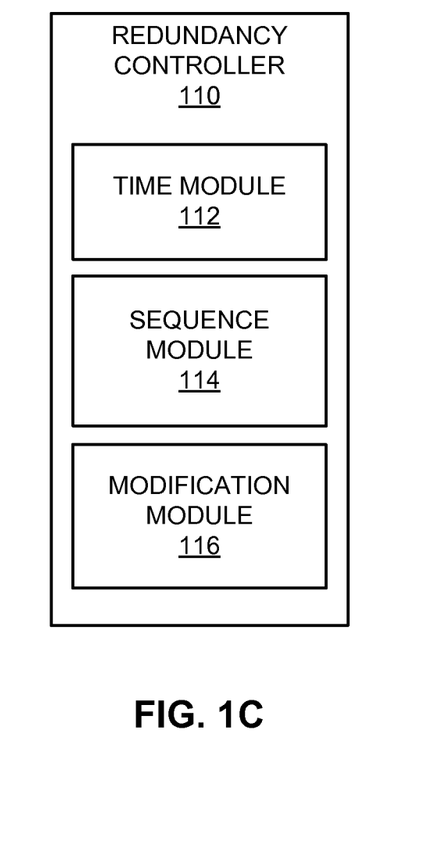
FIG. 1C shows a redundancy controller, according to an example of the present disclosure.

FIG. 1C shows a redundancy controller 110 according to an example of the present disclosure. The redundancy controller 110 in this example may be any one of redundancy controllers 110A-N shown. The redundancy controller 110 may include and process the functions of a time module 112, a sequence module 114, and a modification module 116.

The time module 112, for instance, may identify a time threshold for receiving an acknowledgement to a non-idempotent primitive. The sequence module 114, for instance, may initiate a sequence that includes at least one non-idempotent primitive to access a stripe in the fault-tolerant memory fabric. In response to a determination by the time module 112 that the time threshold for the non-idempotent primitive has expired, the modification module 116, for instance, may perform the following functions. The modification module 116 may request a read of other data in other cachelines in the stripe, request the use of RAID to regenerate data that was potentially corrupted by a first transmission of the non-idempotent primitive, request a write of the regenerated data to the stripe, request a computation of a new parity value, and request an idempotent write primitive to write the new parity to the stripe.

In this example, modules 112-116 are circuits implemented in hardware. In another example, the functions of modules 112-116 may be machine readable instructions stored on a non-transitory computer readable medium and executed by a processor, as discussed further below in FIG. 7.

Figure 2:
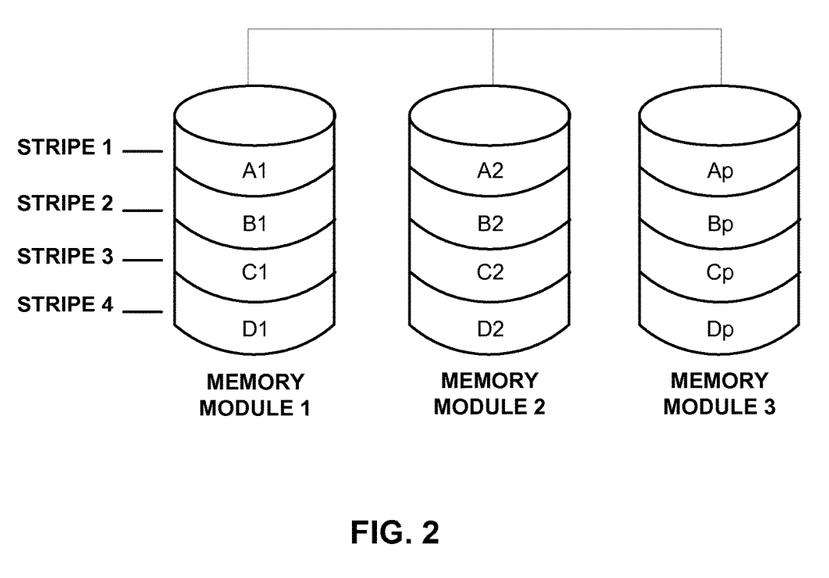
FIG. 2 shows RAID stripes across multiple memory modules in a fault-tolerant memory fabric, according to an example of the present disclosure.

Referring to FIG. 2, the example fault tolerant scheme disclosed herein may use memory associated with multiple memory modules (memory module 1, memory module 2, and memory module 3) to store RAID blocks A1-Dp, in which "p" represents an integer value greater than one. According to this example, each RAID block may include a single cacheline. A cacheline is the largest unit of data that can be atomically read or written to a memory module. A cacheline could be of any size used by processors, such as 64 bytes. The use of a single cacheline RAID block size should not be taken restrictively. Cachelines A1, A2, B1, B2, C1, C2, D1, and D2 represent data cachelines that are distributed across memory module 1 and memory module 2. Cachelines Ap, Bp, Cp, and Dp represent parity cachelines that are stored in memory module 3. The parity cachelines provide redundancy for the data cachelines.

A stripe may include a combination of data cachelines from at least one memory module and parity cachelines from at least one other memory module. In other words, a stripe may include memory blocks distributed across multiple modules which contain redundant information, and must be atomically accessed to maintain the consistency of the redundant information. For example, one stripe may include cachelines A1, A2, and Ap (stripe 1), another stripe may include cachelines B1, B2, and Bp (stripe 2), another stripe may include cachelines C1, C2, and Cp (stripe 3), and another stripe may include cachelines D1, D2, and Dp (stripe 4). The data cachelines in a stripe may or may not be sequential in the address space of the processor 102. A RAID memory group may include stripes 1-4. The example in FIG. 2 represents a RAID-4 configuration, where all parity cachelines are stored on a single memory module. Other RAID configurations, such as RAID-1 where the parity cachelines are mirrors of the data cachelines, and RAID-5 where parity cachelines distributed across all memory modules, and other redundancy schemes are also covered by the present disclosure.

According to this example, if memory module 1 fails, the data cachelines from memory module 2 may be combined with the corresponding-stripe parity cachelines from memory module 3 (using the boolean exclusive-or function) to reconstruct the missing cachelines. For instance, if memory module 1 fails, then stripe 1 may be reconstructed by performing an exclusive-or function on data cacheline A2 and parity cacheline Ap to determine data cacheline A1. In addition, the other stripes may be reconstructed in a similar manner using the fault tolerant scheme of this example. In general, a cacheline on a single failed memory module may be reconstructed by using the exclusive-or function on the corresponding-stripe cachelines on all of the surviving memory modules. The use of the simple exclusive-or operation in the reconstruction of missing data should not be taken restrictively. Different data-recovery operations may involve different mathematical techniques. For example, RAID-6 commonly uses Reed-Solomon codes.

As discussed above, when a response packet is lost, for instance, the response packet is not received at a requesting redundancy controller within a predetermined time threshold in other end-to-end retransmission sequences, the requesting redundancy controller does not know whether the request packet was lost enroute to the media controller or whether the resulting response packet was lost on a return route to the requesting redundancy controller. These two scenarios are illustrated in FIGS. 3 and 4 below.

Figure 3:
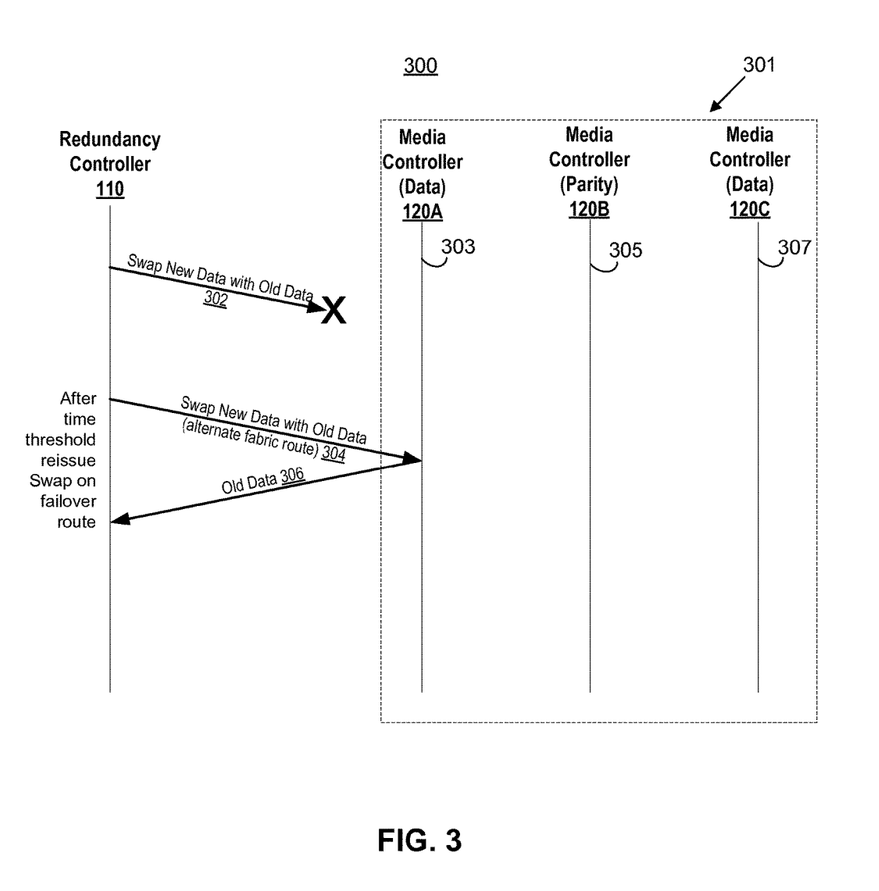
FIG. 3 shows a bounce diagram of an end-to-end retransmission sequence where a requested non-idempotent primitive is lost enroute to a media controller, according to an example of the present disclosure.
Figure 4:
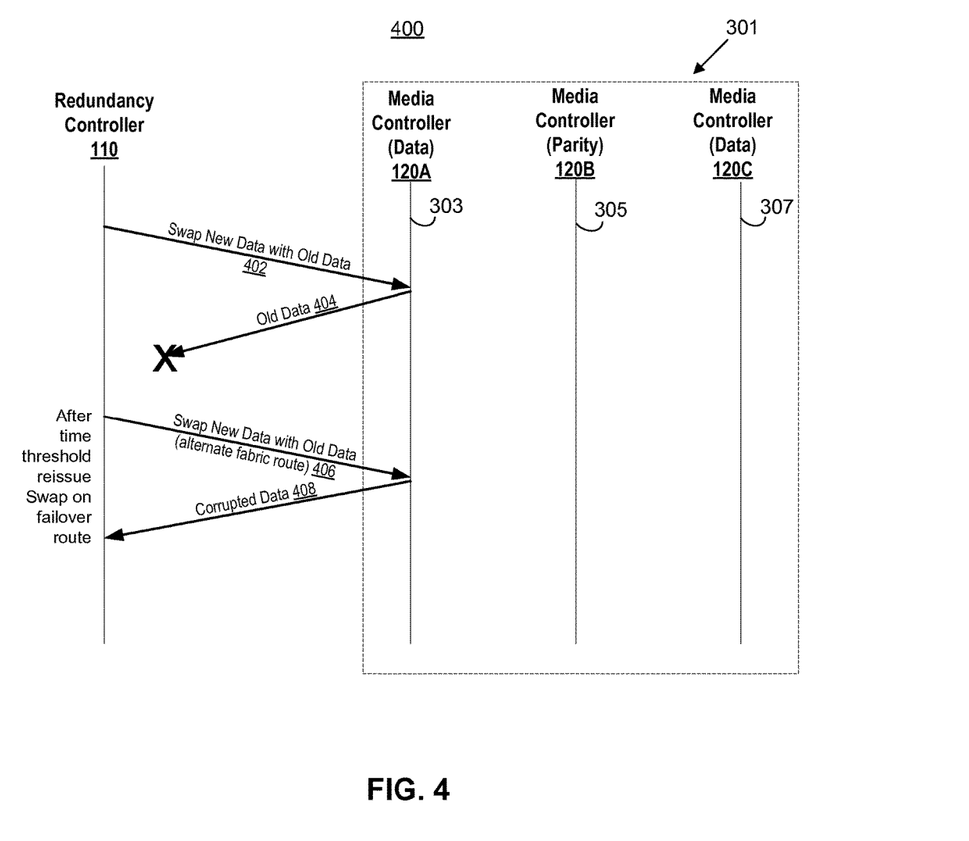
FIG. 4 shows a bounce diagram of an end-to-end retransmission sequence where a response packet to a requested non-idempotent primitive is lost, according to an example of the present disclosure.

FIG. 3 shows a bounce diagram of an end-to-end retransmission sequence 300 where a requested non-idempotent primitive is lost enroute to a media controller, according to an example of the present disclosure. Redundancy controller 110 and three media controllers 120A-C are depicted in FIG. 3. Redundancy controller 110 accesses a stripe 301 that includes data cachelines stored in the first and second memory modules 303, 307 and a parity cacheline stored in the third memory module 305. It is noted that transactions that are needed to update and compute a new parity are not shown to avoid clutter. Transactions to acquire and release stripe locks to ensure atomicity in the presence of multiple redundancy controllers are similarly omitted.

At arc 302, the redundancy controller 110 issues a non-idempotent primitive request packet, such as a swap primitive, to the media controller 120A of the first data memory module 303 in stripe 301. The swap primitive is a non-idempotent primitive that reads the old data, and then writes the new data to the first data memory module 303 in one merged primitive. As such, the redundancy controller 110 requests to swap new data with old data in arc 302. In the example of FIG. 3, however, the non-idempotent swap primitive request packet is lost enroute to the media controller 120A due to a memory fabric failure. Thus, after waiting for the expiration of a time threshold (i.e., a timeout), the redundancy controller 110 may reissue the non-idempotent swap primitive request packet to the media controller 120A via an alternate fabric route in accordance with the end-to-end retransmission sequence protocol, as shown in arc 302. If the non-idempotent swap primitive request packet is received and successful, the media controller 120A may return a response packet with the old data to the redundancy controller 110 as shown in arc 304.

In this scenario, the non-idempotent swap primitive does not have a harmful effect upon the end-to-end retransmission sequence because the initial non-idempotent primitive packet in arc 302 never reached the media controller 120A. In other words, the old data in the first data memory module 303 in stripe 301 remains unchanged, and therefore the reissued non-idempotent swap primitive request packet in arc 304 will receive the correct old data as shown in arc 306.

On the other hand, FIG. 4 shows a bounce diagram of an end-to-end retransmission sequence 400 where a response packet to a requested non-idempotent primitive is lost, according to an example of the present disclosure. Once again it is noted that transactions that are needed to update and compute a new parity are not shown to avoid clutter. Transactions to acquire and release stripe locks to ensure atomicity in the presence of multiple redundancy controllers are similarly omitted.

At arc 402, the redundancy controller 110 issues a non-idempotent primitive request packet, such as a swap primitive, to the media controller 120A of the first data memory module 303 in stripe 301. Upon receiving the non-idempotent swap primitive request packet, the media controller 120A may store the new data in memory, and return old data from the first data memory module 303 in a response packet to the redundancy controller 110, as shown in arc 404. However, on the return route, the response packet of arc 404 is lost due to a memory fabric failure.

After waiting for the expiration of a time threshold, the redundancy controller 110 may reissue the non-idempotent swap primitive request packet to the media controller 120A via an alternate fabric route in accordance with the end-to-end retransmission sequence protocol, as shown in arc 406. However, this reissued non-idempotent swap primitive request packet is harmful because the new data has already been written to the first data memory module 303 in stripe 301 by the initial swap primitive of arc 402. That is, media controller 120A may receive the same non-idempotent swap primitive packet twice. In this regard, the media controller 120A returns a response packet to the redundancy controller 110 with corrupted data in arc 408. That is, the media controller 120 returns a response packet with incorrect "old" data that has already been overwritten with the new data in the initial swap primitive of arc 402.

Accordingly, in this scenario, the non-idempotent swap primitive has a harmful effect upon the end-to-end retransmission sequence because the initial primitive packet in arc 402 was received and executed by the media controller 120A. In other words, the old data in the first data memory module 303 in stripe 301 is swapped with the new data, and therefore the reissued non-idempotent swap primitive request packet in arc 402 will receive incorrect and corrupt data as shown in arc 408.

The methods disclosed below in FIGS. 5-7 describe examples of methods for modifying a retransmission sequence involving non-idempotent primitive packets to avoid the duplicate access hazards described in FIG. 4 above. It should be apparent to those of ordinary skill in the art that the methods 500-700 represent generalized illustrations and that other sequences may be added or existing sequences may be removed, modified or rearranged without departing from the scopes of the methods 500-700.

Figure 5:
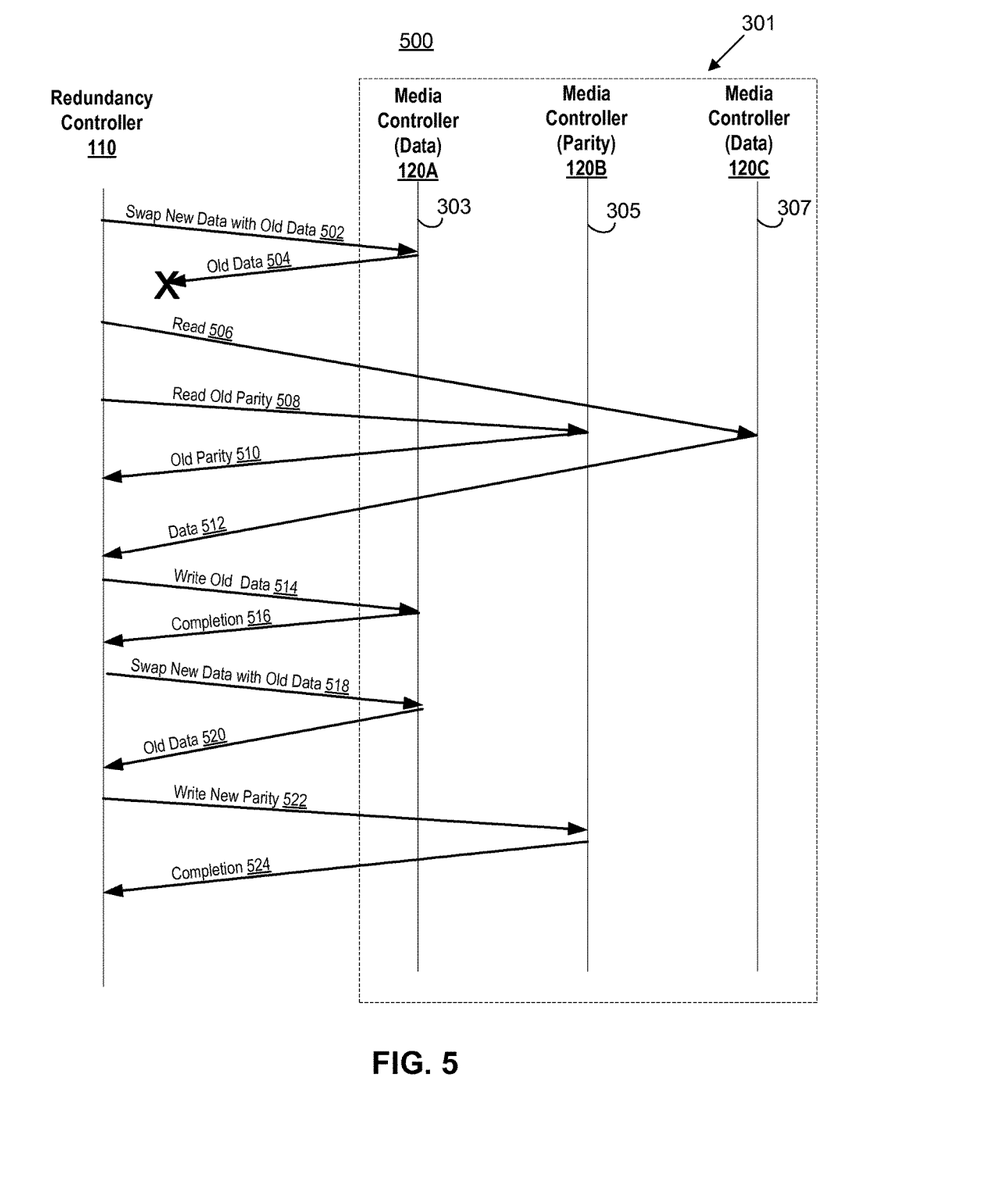
FIG. 5 shows bounce diagram of a method to modify a retransmission sequence involving non-idempotent primitive packets in fault-tolerant memory, according to an example of the present disclosure.

FIG. 5 shows a bounce diagram of a method 500 to modify a retransmission sequence involving non-idempotent primitive packets in fault-tolerant memory, according to an example of the present disclosure. The disclosed example of FIG. 5 provides a method to safely use non-idempotent primitives across a protocol-layer end-to-end retransmission-protected memory fabric by modifying the sequence to utilize storage redundancy to reconstruct lost packets from the non-idempotent primitives.

At arc 502, the redundancy controller 110 issues a non-idempotent swap primitive request packet to the media controller 120A of the first data memory module 303 in stripe 301. Upon receiving the non-idempotent swap primitive request packet, the media controller 120A may return old data from the first data memory module 303 in a response packet to the redundancy controller 110, as shown in arc 504. However, on the return route, the response packet of arc 504 may be lost due to a memory fabric failure.

After waiting for the expiration of a time threshold, the redundancy controller 110 may use redundancy to reconstruct and write the old data in the first data memory module 303. For example, the redundancy controller 110 may issue a read primitive to the second data memory module 307 and may issue a read primitive to the parity memory module 305, as shown in arcs 506 and 508. As a result, the redundancy controller 110 may receive the old parity from the media controller 120B and data from media controller 120C, as shown in arcs 510 and 512. At arc 514, the redundancy controller 110 may then reconstruct the old data by performing an exclusive-or function on the old parity and the data received in arcs 510 and 512 and write the old data to the first data memory module 303. In response to writing the old data, the redundancy controller 110 may receive a completion message from the media controller 120A at arc 516.

According to an example, the redundancy controller 110 may attempt an end-to-end retransmission of the non-idempotent swap primitive on an alternate fabric route, as shown at arc 518. Upon receiving the non-idempotent swap primitive request, the media controller 120A may return old data from the first data memory module 303 in a response packet to the redundancy controller 110, as shown at arc 520. As shown at arc 522, the redundancy controller 110 may then issue an idempotent write primitive to commit a new parity to the parity memory module 305 to keep the stripe 301 consistent. At arc 524, the redundancy controller 110 may receive a completion message from the media controller 120B. At this point, method 500 has successfully modified a retransmission sequence to utilize redundancy and an alternate fabric route to safely recover from a fabric failure.

Figure 6:
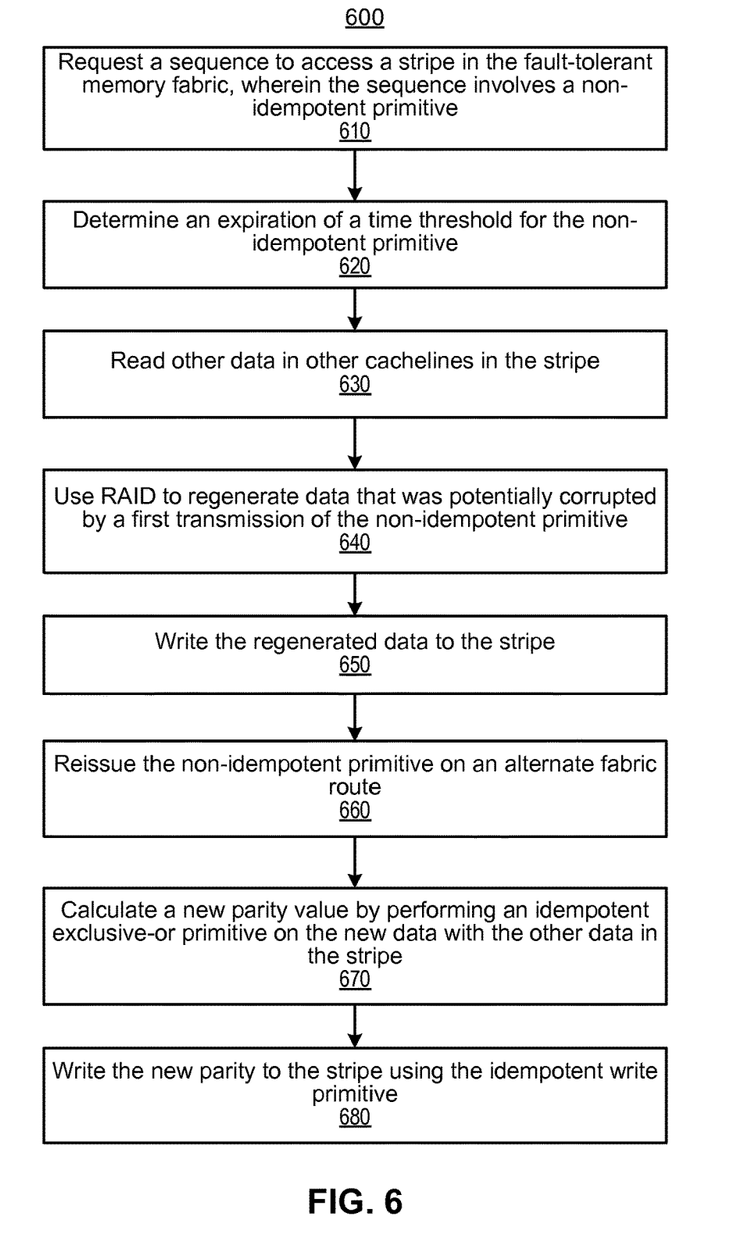
FIG. 6 shows a flow diagram of a method to modify a retransmission sequence involving non-idempotent primitives in a fault-tolerant memory, according to an example of the present disclosure.

With reference to FIG. 6, there is shown a flow diagram of a method 600 to modify a retransmission sequence involving non-idempotent primitives in a fault-tolerant memory, according to an example of the present disclosure.

Prior to performing a sequence that involves at least one non-idempotent primitive, a determination is made as to whether the redundancy controller is in a degraded mode. The degraded mode is an operation of the redundancy controller following the failure of a survivable subset of the media controllers or their memory devices. In a degraded mode, reads and writes access the surviving media controllers only. According to an example, in response to determining that the redundancy controller is in the degraded mode, an alternate sequence that involves only idempotent primitives may be requested. On the other hand, in response to determining that the redundancy controller is not in the degraded mode, the redundancy controller may perform the sequence that involves the at least one non-idempotent primitive.

In this regard, the redundancy controller 110 may request a lock from the media controller 120B. The stripe 301 may include data stored in at least one data memory module and parity stored in at least one parity module. Since there is typically no single point of serialization for multiple redundancy controllers that access a single stripe, a point of serialization may be created at the media controller 120B. The point of serialization may be created at the media controller 120B because any sequence that modifies the stripe 301 has to access the parity. Accordingly, the redundancy controller 110 may obtain the lock for the stripe 301. The lock may provide the redundancy controller 110 with exclusive access to the stripe. For instance, the lock prevents a second redundancy controller from concurrently performing a second sequence that accesses multiple memory modules in the stripe 301 during the locked sequence.

As shown in block 610, the redundancy controller, for instance, may request a sequence to access a stripe in the fault-tolerant memory fabric. In this example, the redundancy controller is not in a degraded mode and the sequence includes at least one non-idempotent primitive. The non-idempotent primitive may be, for example, an optimized swap primitive that merges a data read primitive and a data write primitive into a single primitive. In another example, the non-idempotent primitive may be an optimized exclusive-or primitive that merges a parity read primitive and a parity write primitive merged into a single primitive. Specifically, the optimized exclusive-or primitive includes performing an idempotent exclusive-or primitive on old data from the cacheline with the new data from the cacheline to determine a resulting exclusive-or value, performing the idempotent exclusive-or primitive on the resulting exclusive-or value with an old parity to determine a new parity, and writing the new parity to the stripe using the idempotent write primitive.

According to an example, the redundancy controller may set a timer to monitor the duration between requesting a non-idempotent primitive and receiving a completion message for the requested non-idempotent primitive from an associated media controller. In block 620, the redundancy controller may determine that the duration for the non-idempotent primitive has exceeded a predetermined time threshold (e.g., the time threshold has expired). The time threshold, for instance, is a predefined duration in which a completion message to a requested primitive is expected to be received at the redundancy controller from the media controller.

In response to determining an expiration of a time threshold for the non-idempotent primitive, the redundancy controller may read other data in other cachelines in the stripe as shown in block 630 and use RAID to regenerate data that was potentially corrupted by a first transmission of the non-idempotent primitive as shown in block 640. As a result, the redundancy controller may request a write primitive to write the regenerated data to the stripe as shown in block 650. Furthermore, the redundancy controller may reissue the non-idempotent primitive on an alternate fabric route in block 660 and calculate a new parity value by performing an idempotent exclusive-or primitive on the new data with the other data in the stripe as shown in block 670. In this regard, for instance, the redundancy controller may request an idempotent write primitive to write the new parity to the stripe, as shown in block 680. Accordingly, the retransmission sequence is modified in method 600 to avoid data corruption in the stripe and safely use non-idempotent primitives in a protocol-layer end-to-end retransmission-protected memory fabric.

According to another example, if the redundancy controller receives the completion message within the predetermined time threshold, then the redundancy may acknowledge that the requested non-idempotent primitive has been completed on the stripe and proceed with the next primitive of the sequence. For example, the redundancy controller may request another non-idempotent primitive in the sequence and iteratively perform the steps in blocks 620-680 if necessary. Once the sequence has completed, the redundancy controller 110 may then release the lock for the stripe 301.

Some or all of the operations set forth in the methods 500 and 600 may be contained as utilities, programs, or subprograms, in any desired computer accessible medium. In addition, the methods 500 and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 7:
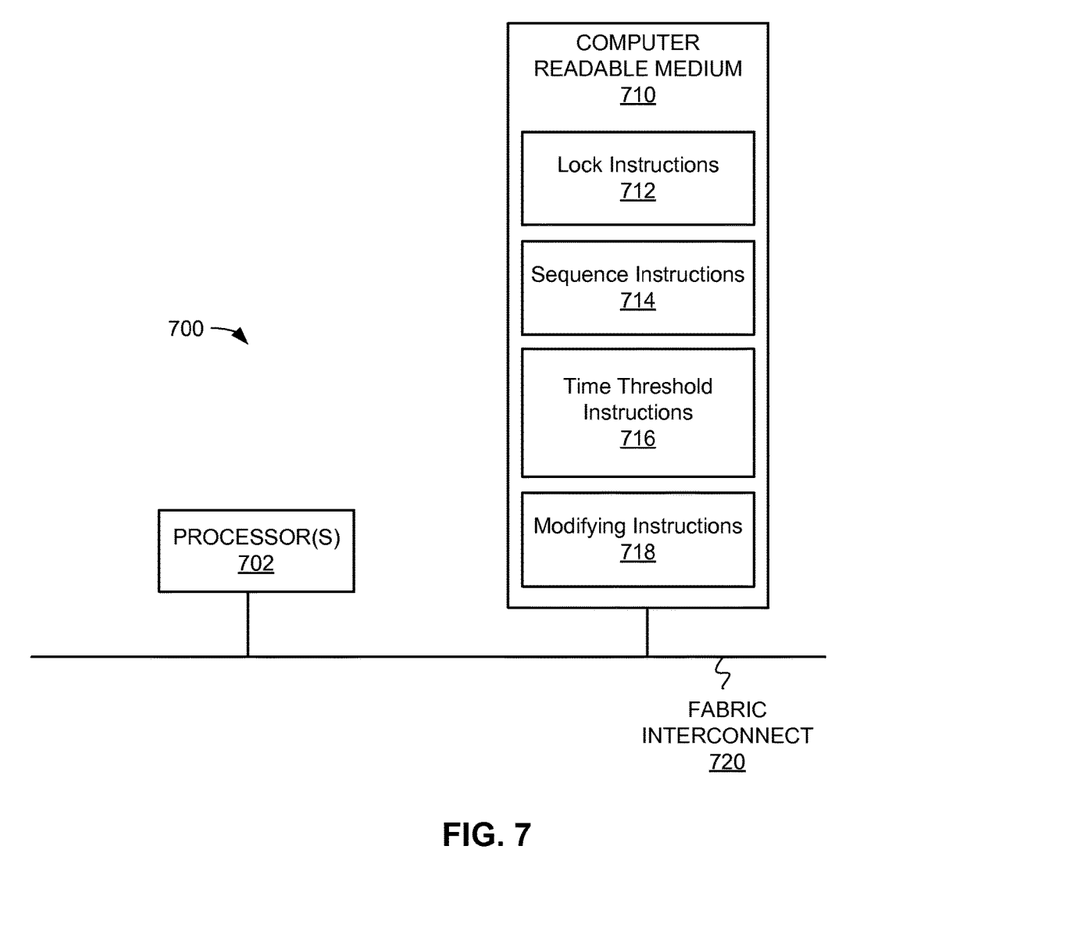
FIG. 7 shows a schematic representation of a computing device, which may be employed to perform various functions of a redundancy controller, according to an example of the present disclosure.

Turning now to FIG. 7, a schematic representation of a computing device 700, which may be employed to perform various functions of the redundancy controller 110 as depicted in FIG. 1C, is shown according to an example implementation. The device 700 may include a processor 702 coupled to a computer-readable medium 710 by a fabric interconnect 720. The computer readable medium 710 may be any suitable medium that participates in providing instructions to the processor 702 for execution. For example, the computer readable medium 710 may be non-volatile media, such as an optical or a magnetic disk; volatile media, such as memory.

The computer-readable medium 710 may store instructions to perform methods 500 and 600. For example, the computer-readable medium 710 may include machine readable instructions such as lock instructions 712 to request and release a lock to perform a sequence with a non-idempotent primitive on the stripe, sequence instructions 714 to request a sequence with a non-idempotent primitive on the stripe, time threshold instructions 716 to determine whether a time threshold for receiving a completion message for the non-idempotent primitive has expired, and in response to determining the expiration of the time threshold, modifying instructions 718 to initiate a use of RAID to regenerate data that was potentially corrupted by a first transmission of the non-idempotent primitive, initiate a write of the regenerated data to the stripe, initiate a computation of a new parity value, and initiate the idempotent write primitive to write the new parity to the stripe. In this regard, the computer-readable medium 710 may include machine readable instructions to perform methods 500 and 600 when executed by the processor 702.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for modifying a retransmission sequence involving non-idempotent primitives in a fault-tolerant memory fabric, the method comprising:
    requesting, by a redundancy controller, a sequence to access a stripe in the fault-tolerant memory fabric, wherein the sequence involves a non-idempotent primitive; and
    in response to determining an expiration of a time threshold for the non-idempotent primitive,
        reading other data in other cachelines in the stripe,
        using redundant array of independent disks (RAID) to regenerate data that was potentially corrupted by a first transmission of the non-idempotent primitive,
        writing the regenerated data to the stripe,
        reissuing the non-idempotent primitive on an alternate fabric route,
        calculating a new parity value by performing an idempotent exclusive-or primitive on the new data with the other data in the stripe, and
        writing the new parity to the stripe using the idempotent write primitive.

2. The method of claim 1, further comprising:
    acknowledging that the requested non-idempotent primitive has been completed on the stripe in response to receiving a response to the requested non-idempotent primitive within the time threshold.

3. The method of claim 2, wherein acknowledging that the non-idempotent primitive has been completed on the stripe further comprises:
    requesting another non-idempotent primitive in the sequence;
    in response to determining an expiration of the time threshold for the other non-idempotent primitive,
        reading other data in the other cachelines in the stripe,
        using RAID to regenerate data that was potentially corrupted by a first transmission of the other non-idempotent primitive,
        writing the regenerated data to the stripe,
        calculating a new parity value by performing an idempotent exclusive-or primitive on the new data with the other data in the stripe, and
        writing the new parity to the stripe using the idempotent write primitive.

4. The method of claim 1, wherein the time threshold is a predefined duration in which a completion message to a requested primitive is expected to be received at the redundancy controller from the media controller.

5. The method of claim 1, further comprising:
    obtaining a stripe lock prior to requesting the sequence to access the stripe in the memory fabric; and
    releasing the stripe lock in response to completing the sequence.

6. The method of claim 1, wherein the non-idempotent primitive comprises an optimized swap primitive that merges a data read primitive and a data write primitive into a single primitive.

7. The method of claim 1, wherein the non-idempotent primitive comprises an optimized exclusive-or primitive that merges a parity read primitive and a parity write primitive merged into a single primitive.

8. The method of claim 7, wherein the optimized exclusive-or primitive further comprises:
    performing the idempotent exclusive-or primitive on old data from the cacheline with the new data from the cacheline to determine a resulting exclusive-or value;
    performing the idempotent exclusive-or primitive on the resulting exclusive-or value with an old parity to determine a new parity; and
    writing the new parity to the stripe using the idempotent write primitive.

9. The method of claim 1, wherein prior to requesting the sequence to access the stripe, determining whether the redundancy controller is in degraded mode; and
    in response to determining that the redundancy controller is in the degraded mode, requesting an alternate sequence involving only idempotent primitives.

10. A redundancy controller to modify a retransmission sequence involving non-idempotent primitives in a fault-tolerant memory fabric, the redundancy controller comprising:
    a time module to identify a time threshold for receiving an acknowledgement to a non-idempotent primitive;
    a sequence module to initiate a sequence that includes at least one non-idempotent primitive to access a stripe in the fault-tolerant memory fabric; and
    a modification module to, in response to the time module determining an expiration of the time threshold for the non-idempotent primitive:
        request a read of other data in other cachelines in the stripe,
        request the use of redundant array of independent disks (RAID) to regenerate data that was potentially corrupted by a first transmission of the non-idempotent primitive,
        request a write of the regenerated data to the stripe,
        request a computation of a new parity value, wherein the computation includes performing an idempotent exclusive-or primitive on the new data with the other data in the stripe, and
        request the idempotent write primitive to write the new parity to the stripe.

11. The redundancy controller of claim 10, wherein in response to receiving the acknowledgement of the non-idempotent primitive within the time threshold, the sequence module is to acknowledge that the requested non-idempotent primitive has been completed on the stripe.

12. The redundancy controller of claim 10, wherein the sequence module is to:
    obtain a stripe lock prior to requesting the sequence to access the stripe in the memory fabric; and
    release the stripe lock in response to completing the sequence.

13. A non-transitory computer readable medium to obtain a lock for a stripe from a media controller to perform a sequence of non-idempotent primitives, including machine readable instructions executable by a processor to:
    request a lock on the stripe;
    request a sequence with a non-idempotent primitive on the stripe;
    in response to determining an expiration of a time threshold for receiving a completion message for the non-idempotent primitive,
        initiate a use of redundant array of independent disks (RAID) to regenerate data that was potentially corrupted by a first transmission of the non-idempotent primitive,
        initiate a write of the regenerated data to the stripe,
        initiate a computation of a new parity value, wherein the computation includes performing an idempotent exclusive-or primitive on the new data with the other data in other cachelines in the stripe, and initiate the idempotent write primitive to write the new parity to the stripe;

in response to receiving a response to the non-idempotent primitive within the time threshold, acknowledge the completion of the non-idempotent primitive on the stripe; and release the lock for the stripe.

14. The non-transitory computer readable medium of claim 13, wherein to acknowledge the completion of the non-idempotent primitive on the stripe, the machine readable instructions are executable by the processor to request another non-idempotent primitive in the sequence.

15. The non-transitory computer readable medium of claim 13, wherein in response to determining the expiration of the time threshold for the other non-idempotent primitive, the machine readable instructions are executable by the processor to:

initiate a read of the other data in the other cachelines in the stripe, initiate a use of RAID to regenerate data that was potentially corrupted by a first transmission of the non-idempotent primitive, initiate a write of the regenerated data to the stripe, initiate a computation of a new parity value by performing an idempotent exclusive-or primitive on the new data with the other data in the stripe, and initiate a write of the new parity to the stripe using the idempotent write primitive.

* * * * *